United States Patent [19]
LeBlanc et al.

[11] Patent Number: 5,931,988
[45] Date of Patent: Aug. 3, 1999

[54] CABINET FILTER ASSEMBLY AND METHODS

[75] Inventors: James A. LeBlanc, Eden Prairie; Joseph C. Tokar, Apple Valley; Daniel T. Risch, Burnsville, all of Minn.

[73] Assignee: Donaldson Company, Inc., Minneapolis, Minn.

[21] Appl. No.: 08/984,889

[22] Filed: Dec. 4, 1997

[51] Int. Cl.⁶ .................................................. B01D 46/02
[52] U.S. Cl. ............................ 95/286; 55/341.1; 55/378; 55/472; 55/478; 55/484; 55/493; 55/502; 55/508
[58] Field of Search ................................ 55/341.1, 341.2, 55/341.6, 508, 511, 509, 378, 472, 483, 484, 493, DIG. 12, DIG. 31, 381, 362, 478, 481; 95/286

[56] References Cited

U.S. PATENT DOCUMENTS

| | | |
|---|---|---|
| 3,733,790 | 5/1973 | Pierce . |
| 3,788,046 | 1/1974 | Kaeppler et al. ........................ 55/341.1 |
| 3,873,286 | 3/1975 | Wurtenberg ................................ 55/378 |
| 4,704,144 | 11/1987 | LeBlanc et al. . |
| 5,277,704 | 1/1994 | Miller et al. ............................. 55/341.2 |

FOREIGN PATENT DOCUMENTS

| | | | |
|---|---|---|---|
| 6-226024 | 8/1994 | Japan ................................ 55/DIG. 31 |

OTHER PUBLICATIONS

Torit Installation and Operation Manual, Series 50, 60, 70, snf 80; Models 54, 64, 66, 75, 81 and 84, Donaldson Company, Inc. (1990).

*Primary Examiner*—Jay H. Woo
*Assistant Examiner*—Robert A. Hopkins
*Attorney, Agent, or Firm*—Merchant, Gould, Smith, Edell, Welter & Schmidt, P.A.

[57] ABSTRACT

A filter assembly includes a filter cabinet defining an interior. A filter component is suspended within the filter cabinet interior. The filter component includes an outer frame having first and second rigid frame sections. The first and second rigid frame sections are pivotable, relative to each other about a pivot arrangement, such as a hinge. The first and second frame sections hold filter bags, such that the filter bags are suspended from the frame in the cabinet interior. Methods of changing a filter bag in a cabinet air filter assembly are provided.

26 Claims, 11 Drawing Sheets

CABINET FILTER ASSEMBLY AND METHODS

BACKGROUND OF THE INVENTION

1. Field of the Invention

The present invention relates to filter assemblies and methods. More particularly, the present invention relates to cabinet filter assemblies, wherein the filter element includes a series of bags suspended within the cabinet for filtering dust and other particulate matter from the air.

2. Description of the Related Art

A variety of arrangements are available for removing dust and other foreign matter from gas, such as air. In one system, a dedicated cabinet is used to house a plurality of cloth bags, functioning as filter elements. These types of air filtering arrangements are typically used in an industrial setting. Such arrangements typically draw contaminated air into the cabinet by a blower assembly which is housed within the dedicated cabinet. The blower assembly creates a vacuum to draw the contaminated air in, pass through the cloth bags, and out through an exhaust. Typically, after a period of usage, the exterior surface of the cloth bags become loaded with dust. The bags are then shaken in order to dislodge the dust and other contaminants from the surface of the bag. The dust and other contaminants fall into a dust pan at the bottom of the cabinet collector.

SUMMARY OF THE INVENTION

In accordance with the invention, a filter component is provided. The filter component includes an outer frame having first and second rigid frame sections. The first rigid frame section is pivotable, relative to the second rigid frame section about a pivot arrangement. Alternatively, the second rigid frame section is pivotable relative to the first frame section, or both the first and second frame sections may be pivoted at the same time relative to each other about the pivot arrangement. There is at least one filter bag mounted on, and depending from the first rigid frame section. There is at least a second filter bag mounted on, and depending from the second rigid frame section.

The outer frame has first and second opposite sides. The two filter bags are oriented to depend from the outer frame section side. A perimeter gasket member is oriented on the outer frame first side of the filter component.

Preferably, the pivot arrangement comprises a hinge arrangement. More preferably, the hinge arrangement comprises a living hinge having first and second opposite hinge plates securing the first and second rigid frame sections. In one arrangement, the living hinge comprises a band, or strip, of material, such as a high density polyethylene material adhered to the first and second rigid frame sections.

Preferably, the first rigid frame section is substantially identical to the second rigid frame section. That is, the first and second frame sections, when oriented co-planar to one another, together exhibit a two-fold axis of symmetry about a central orthogonal axis of rotation.

The first and second rigid frame sections each have a plurality of filter mounting wall arrangements projecting outwardly therefrom. In one embodiment, each of the filter mounting wall arrangements comprise first and second spaced, aligned, wall sections positioned on opposite sides of an associated filter bag mounting slot.

Preferably, each mounting slot includes an associated filter bag projecting therethrough. In one embodiment, each filter bag includes first and second side walls. Each filter bag side wall is releasably secured to a selected, associated, wall section. Preferably, no wall section has more than one filter bag mounted thereto.

The first and second frame sections hold a plurality of filter bags. Preferably, each of the frame sections includes at least 10 filter bags mounted thereon. More preferably, each of the first and second frame sections includes about 12 filter bags mounted thereon.

In one embodiment, each filter bag first side wall is secured to an associated wall section by an elongate pressure clip. Each filter bag second side wall is secured to an associated wall section by an elongated pressure clip.

Preferably, the arrangement includes first and second mounting arrangements. The first mounting arrangement preferably includes first and second mounting rails. The first and second mounting rails may be secured to the first rigid frame section with end portions of the first and second rails projecting beyond an outer periphery of the first rigid frame section. The second mounting arrangement preferably includes third and fourth mounting rails. The third and fourth mounting rails may be secured to the second rigid frame section with end portions of the third and fourth mounting rails projecting beyond an outer periphery of the second rigid frame section.

In one embodiment, each of the first and second rigid frame members includes a plurality of threaded mounting bores therein. The first mounting rail is preferably bolted to at least one of the bores in the first rigid frame member, while the second mounting rail is also preferably bolted to at least one of the bores in the first rigid frame member. The third mounting rail preferably is bolted to at least one of the bores in the second rigid frame member. The fourth mounting rail is preferably bolted to at least one of the bores in the second rigid frame member.

The invention also comprises a filter assembly. The filter assembly includes a filter cabinet defining an interior, and a filter component suspended within the filter cabinet interior. The filter component includes a first frame section, a second frame section, and the first frame section is pivotable relative to the second frame section about a pivot arrangement. The first frame section holds at least one flexible filter element, and the second frame section holds at least one flexible filter element.

Preferably, the filter component includes a perimeter gasket member oriented on the first and second frame sections. Preferably, the filter assembly includes first and second transverse bars secured within the filter cabinet interior. The filter component is mounted within the cabinet interior such that the perimeter gasket top surface engages the first and second transverse bars.

In one arrangement, the filter assembly includes first and second mounting arrangements. The first mounting arrangement is secured to the first frame section and engages the first and second transverse bars. The second mounting arrangement is secured to the second frame section and engages the first and second transverse bars.

Preferably, the first mounting arrangement includes first and second mounting rails, while the second mounting arrangement includes third and fourth mounting rails. In one arrangement, the first and third mounting rails engage the first transverse bar, and the second and fourth mounting rails engage the second transverse bar.

In one embodiment, the cabinet includes an air inlet, an air outlet, and a blower assembly to direct air through the filter component. The cabinet may also include a baffle arrangement to further help direct the air flow.

In another aspect, a method of changing a filter bag of a cabinet air filter assembly is provided. The method includes a step of opening an access port in the cabinet air filter assembly. A first tube sheet having a plurality of filter bags thereon is removed from an interior of the cabinet air filter assembly by passage through the access port. The step of removing also includes a step of least partially folding the first tube sheet.

Preferably, the step of replacing includes replacing the first tube sheet with a second tube sheet having a plurality of filter bags depending thereon. The step of replacing includes a step of at least partially folding the second tube sheet while inserting the tube sheet through the access port and into the interior of the cabinet air filter assembly.

The method may also include a step of replacing at least one of the filter bags on the first tube sheet. The first tube sheet is then reinserted with the replacement filter bag thereon into the interior of the cabinet air filter assembly. The step of reinserting includes a step of at least partially folding the first tube sheet during the reinserting.

The accompanying drawings, which are incorporated in and constitute a part of this specification, illustrate example embodiments of the invention and together with the description, serve to explain the principles of the invention.

DETAILED DESCRIPTION OF THE PREFERRED EMBODIMENT

I. Some Problems with Conventional Arrangements

In one typical arrangement, a plurality of cloth bags are hung from a bar lining the interior of a dust collector cabinet. Typically, dust collector cabinets of conventional arrangements include top and bottom door assemblies. In order to initially install filter bags in the cabinet, the top and bottom doors are opened, an individual bag is inserted through the opening provided by the top door, and the bag is placed within the frame and hung within the cabinet. This is repeated for each individual bag. Typically, not every bag will be able to be easily placed in position, due to the tight fit of adjacent bags. Therefore, in order to install the remaining two to three filter bags, a tool is needed in order to spread the installed bags apart to allow space for the remaining two to three bags. After all of the bags are installed, the bags are sealed in place by tightening a plurality of set screws against an intermittent gasket. The seal created by the gasket typically is against the direction of airflow through the cabinet.

If the user wants to change the filter bags, the above process is reversed. That is, the set screws are loosened, and each individual filter bag is lifted and removed through the top door access opening. A tool may be needed to initially remove the first one to three bags.

This arrangement can lead to problems. For example, when changing out the filter elements, i.e., the cloth bags, it can be a time consuming task. Each one of the individual cloth bags is typically handled separately. In addition, in order to install the remaining two to three bags, tools are often required to spread adjoining bags apart in order to create a space for the remaining bags.

II. FIGS. 1–12

Reference will now be made in detail to the present preferred embodiments of the invention, examples of which are illustrated in the accompanying drawings.

Figure 1:
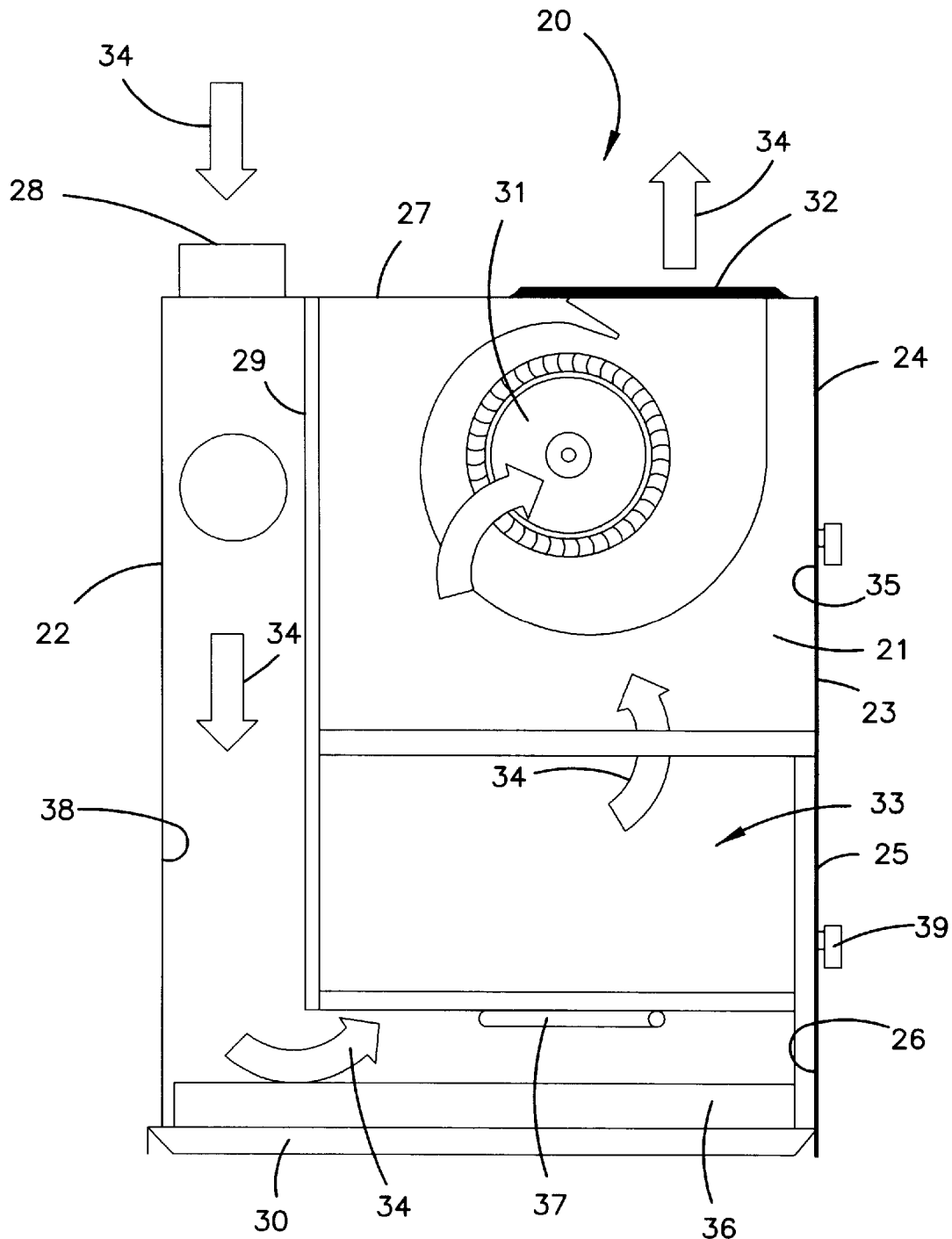
FIG. 1 is a schematic view of a cabinet air filter in operation.

FIG. 1 illustrates a schematic indicating a typical system in which a filter frame assembly according to the present invention is utilized. In FIG. 1, a cabinet air filter is shown generally at 20. Cabinet 20 incorporates an enclosure formed by a side wall 21, a rear wall 22, a front wall 23, and a side wall opposite from side wall 21, removed in this schematic view. A base section 30 closes the bottom of the arrangement. These walls generally form a rectangular closed structure, i.e. a cabinet. The front wall 23 includes first and second door panels 24, 25. In the illustrated schematic view, first and second doors 24, 25 correspond to top and bottom orientations, respectively. The first and second doors 24, 25 may be opened and closed in order to provide access to the interior 26 of the cabinet 20.

At the top of the cabinet 20, opposite to the base section 30, is a removable top cover member 27 having an inlet passage or port 28 for taking in unfiltered, or dirty air. Within the cabinet 20 is a baffle 29 which extends between the side walls and is spaced from the rear wall 22 extending from the upper edge of the walls and toward the lower edge and terminating short of the base section 30 to provide a passage at the rear of the cabinet through which unfiltered air is directed to the interior 26 of the enclosure. Positioned on the top cover member 27 is a motor or blower 31 attached to the top cover member 27. The cover member 27 defines a clean air outlet 32. Positioned within the interior 26 and to the side of the baffle 29 remote from the inlet 28 and beneath the blower 31 is a filter section, indicated generally at 33. Filter section 33 includes a plurality of filter elements to remove dust and other particles from the air.

Air flows in and follows the path shown by arrows 34. That is, the blower 31 creates a vacuum which pulls dirty air in through the inlet 28, down a channel section 38, and to the bottom of the filter section 33. The air then flows through the filter section 33, through the filter elements within the filter section, and into the clean air plenum 35. The clear air is then vented through the outlet 32.

The filter elements within the filter section 33 may include a plurality of cloth bags. In such a system, the dust and other particulate matter is not allowed to pass through the surface of the cloth bag. The dust either falls to the base section and into a pan 36, or it clings to the exterior of the cloth bag. A shaker bar 37 extends across the ends of the cloth bags. Periodically, the shaker bar is actuated, either manually by a pedal 39 or by automation, and the shaker bar 37 knocks the cloth bags up and down in order to remove dust which may have caked on the exterior of the bags.

The principles of operation summarized above are described in U.S. Pat. No. 3,733,790 to Pierce, which patent is hereby incorporated by reference.

Figure 2:
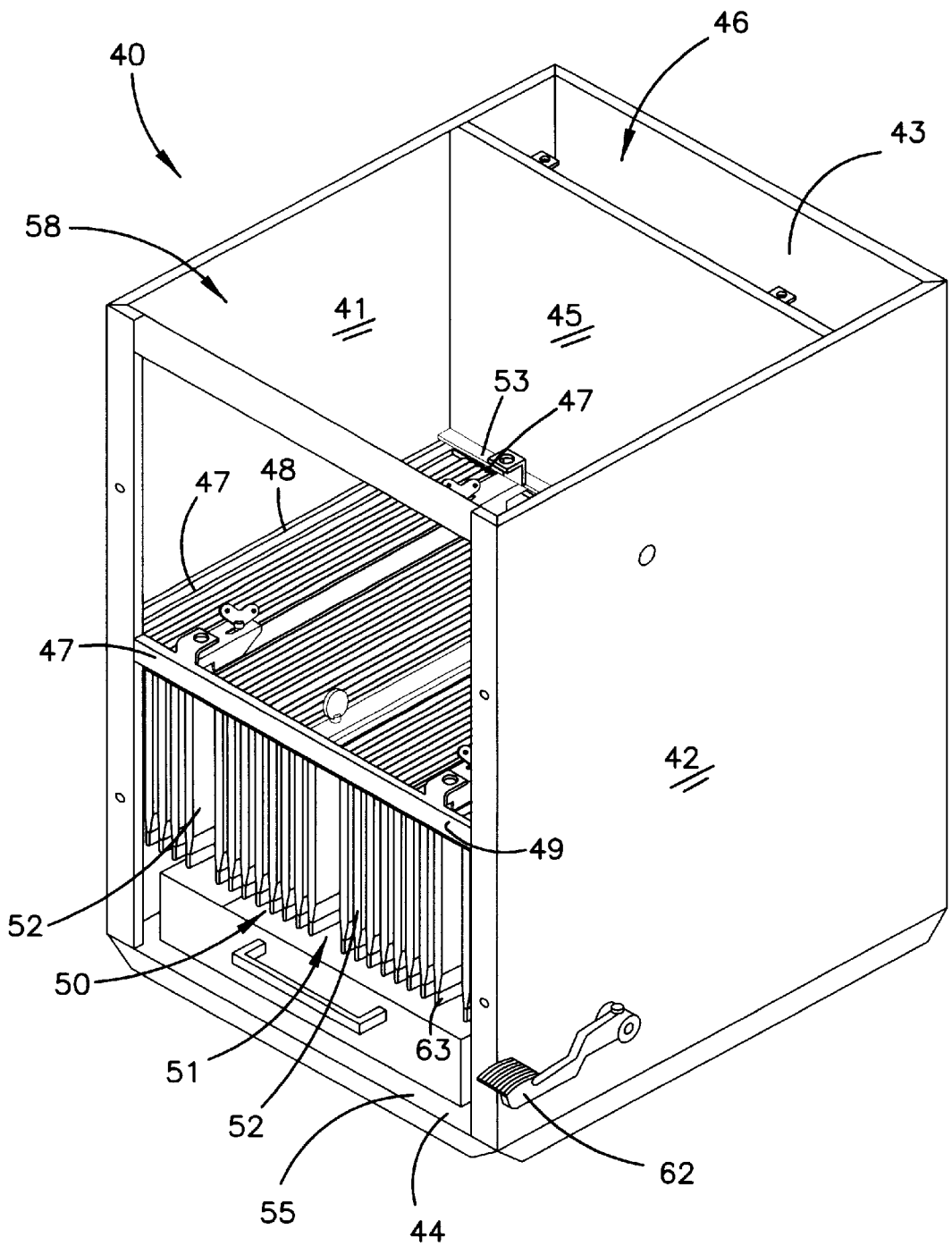
FIG. 2 is a perspective view of a cabinet air filter with a filter frame assembly enclosed therein, according to the present invention.

Turning now to FIG. 2, a perspective view of a cabinet air filter of the present invention is illustrated. The cabinet air filter is shown generally at 40 and includes side walls 41, 42, a rear wall 43, and a base member 44. The cabinet air filter 40 also includes a front wall and a top panel member, which have been removed from FIG. 2 for purposes of clarity. The front wall includes first and second doors corresponding to top and bottom regions of the cabinet air filter 40, similar to those illustrated in FIG. 1. A baffle is shown at 45 as extending between walls 41, 42. A dirty air inlet extends through the top wall between the baffle and the rear wall. The region between the baffle 45 and rear wall 43 defines a dirty air plenum 46. Dirty air is drawn through the inlet above the dirty air plenum 46 and flows between the baffle 45 and rear wall 43.

The cabinet air filter 40 includes four transverse mounting bars 47. A first bar 48 of the mounting bars 47 extends transversely across wall 41; a second bar 49 of the mounting bars 47 extends transversely between walls 41 and 42; a third bar of the mounting bars 47 extends along wall 42; and a fourth bar 53 of mounting bars 47 extends across baffle 45. As explained below, the mounting bars provide a sealing surface to create a seal between them and a filter element assembly.

A filter element assembly is shown generally at 50. Filter element assembly 50 removes dust and particles from the dirty air being drawn in through the dirty air plenum. Filter element assembly includes a plurality of filter elements. In the particular arrangement illustrated, the filter elements include a plurality (twenty-four) of cloth bags 52. Each of the cloth bags 52 engages a frame section which engages the mounting bars 47 in order to be suspended within the cabinet 40. Further discussion of the frame sections are below.

Not shown in FIG. 2 is a blower assembly which may be typically mounted above the filter element assembly 50 within the cabinet 40, similar to the arrangement of FIG. 1. A typical air flow path for the cabinet air filter 40 of FIG. 2 includes dirty air being drawn through an inlet defined by a top panel member, through the dirty air plenum 46, under the bottom of the baffle 45, and under the filter element assembly 50. From there, the air flows through the filter element assembly 50 and through each of the filter elements 51. The air then flows through the cloth bags. The bags are made of a material which allows air to pass freely therethrough, but does not allow foreign particles to pass through. For example, most sizes of flour dust and sawdust cannot pass through the cloth bag. Therefore, dust and other foreign particles either cling to the exterior of the bag, or fall by gravity to the bottom dust pan 55 of the cabinet 40. The air which passes through the cloth bag is then drawn up by the blower assembly to the clean air plenum 58, where it is then exhausted through an outlet through the top panel member.

To clean the arrangement, a shaker bar is provided in order to knock each of the cloth bags 52 around and dislodge dust from the exterior of the bags 52 down into the dust pan 55. A pedal 62 is provided and extends through the side wall 42. The pedal 62 engages a shaker bar, which extends transversely across the cabinet 40 just below a bottom portion 63 of the cloth bags 52. When the pedal 62 is depressed, it causes the shaker bar to move up and down, according to the orientation illustrated in FIG. 2. The shaker bar bumps each one of the cloth bags 52 to cause dust to fall from the exterior surface of the bags 52 and into the dust pan 55.

On occasion, it is desirable to replace the filter elements 51 in the cabinet 40. On occasion, it is also desirable to physically brush each of the cloth bags to ensure adequate dust removal. As explained below, the invention herein is particularly convenient and suitable for allowing quick and simple removal and replacement of the filter element assembly 50.

Figure 3:
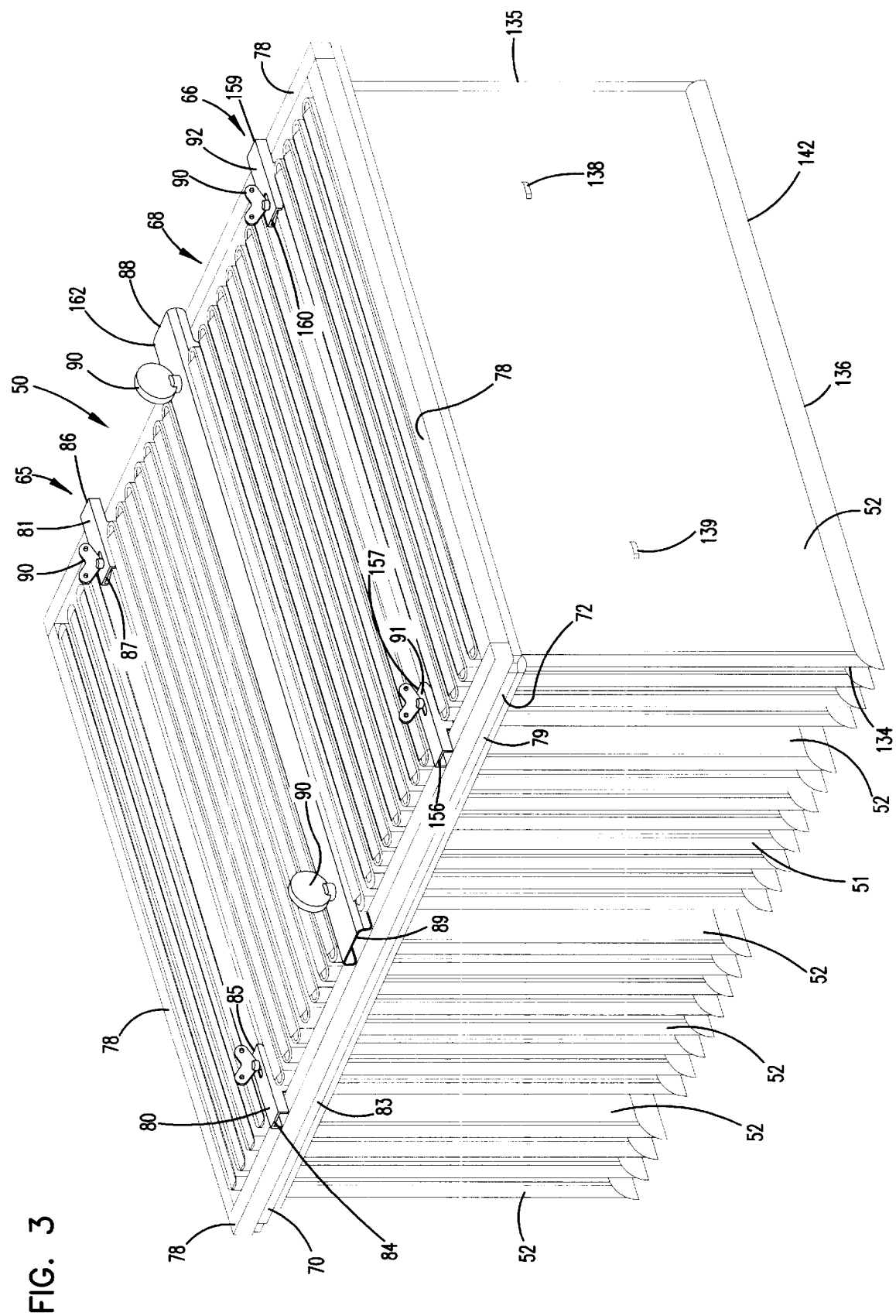
FIG. 3 is a perspective view of a filter frame assembly depicted in FIG. 2, removed from the cabinet, according to the present invention.
Figure 4:
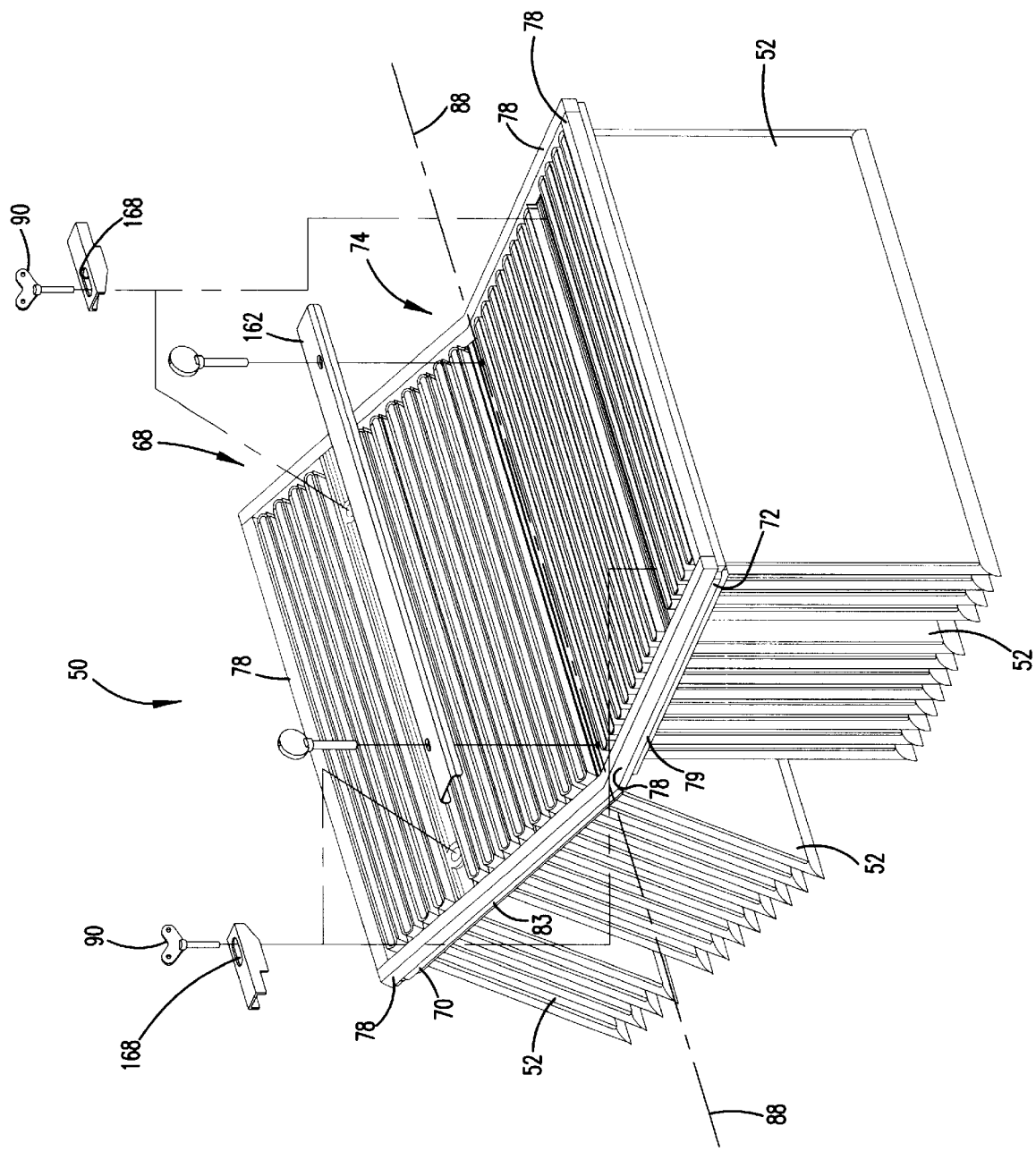
FIG. 4 is a partially exploded, perspective view of the filter frame assembly of FIG. 3, in a pivoted position.

Turning now to FIGS. 3 and 4, the general principles of operation allowing the filter element assembly to be quickly and conveniently changed out from the cabinet are illustrated. The filter element assembly 50 is shown in FIGS. 3 and 4 in perspective view removed from the cabinet 40. The filter element assembly 50 includes an outer frame 68, or tube sheet, for holding filter elements 51 inside of the cabinet 40. The outer frame 68 includes a first frame section 70, and a second frame section 72. The first and second frame sections 70, 72 are pivotable relative to each other. That is, the first frame section 70 may be pivoted relative to the second frame section 72, or the second frame section 72 may be pivoted relative to the first frame section 70. Alternatively, both of the first frame section 70 and second frame section 72 may be simultaneously moved relative to each other.

A variety of operative arrangements are contemplated for permitting this relative movement between the first and second frame sections 70, 72. For example, the first and second frame sections 70, 72 may be pivotable relative to each other through a hinge arrangement. One example of a hinge arrangement includes a removably attachable hook assembly. Another example of a hinge arrangement is illustrated in FIG. 3. In the embodiment illustrated, a hinge arrangement attaches the first and second frame sections 70, 72 together through a hinge 74. Specifically, the particular embodiment shown is a living hinge 75. Hinge 75 is described further below.

In the embodiments illustrated in FIGS. 3 and 4, the filter elements 51 include cloth bags 52. The filter bags 52 are mounted on and depend from one of the first and second frame sections 70, 72. In the particular example illustrated, twelve bags 52 are mounted on the first frame section 70, and twelve bags are mounted on the second frame section 72.

Also shown in FIGS. 3 and 4 is a seal member or gasket 78 which is mounted on the outer frame 68. That is, the gasket 78 extends around the perimeter of the filter element assembly 50. It is secured to the first and second frame sections 70, 72 in a suitable manner, for example, by adhesive. As explained in more detail below, the gasket 78 engages transverse mounting bars 47 in the cabinet to create an air-tight seal.

Still referring to FIGS. 3 and 4, filter element assembly 50 includes arrangements for securing the assembly to cabinet air filter 20. The mounting assembly includes a first mounting arrangement 65 and a second mounting arrangement 66.

First mounting arrangement 65 is selectively, removably secured or attached to and mounts to first frame section 70 and engages transverse bars 47 in the cabinet air filter 20. Second mounting arrangement 66 is removably secured or attached or fixed to second frame section 72 and engages transverse bars 47, when installed in cabinet air filter 20.

While a variety of operative embodiments of first and second mounting arrangement 65, 66 are contemplated, in the particular embodiment illustrated, first mounting arrangement 65 includes a first rail 80 and a second rail 81.

First rail 80 extends partially transversely across a top region of the filter element assembly 50 and is secured to the first frame section 70. The first mounting rail 80 includes opposite ends 84, 85. End 84 extends to an outer periphery 83 of the first frame section 70, while end 85 extends directly over and above first frame section 70.

As shown in FIG. 4, the end 85 which extends directly over and above first frame section 70 is chamfered or bevel cut. This allows for tilting or pivoting of rail 80 relative to frame section 70, when installing filter assembly 50 in cabinet 40.

Figure 5:
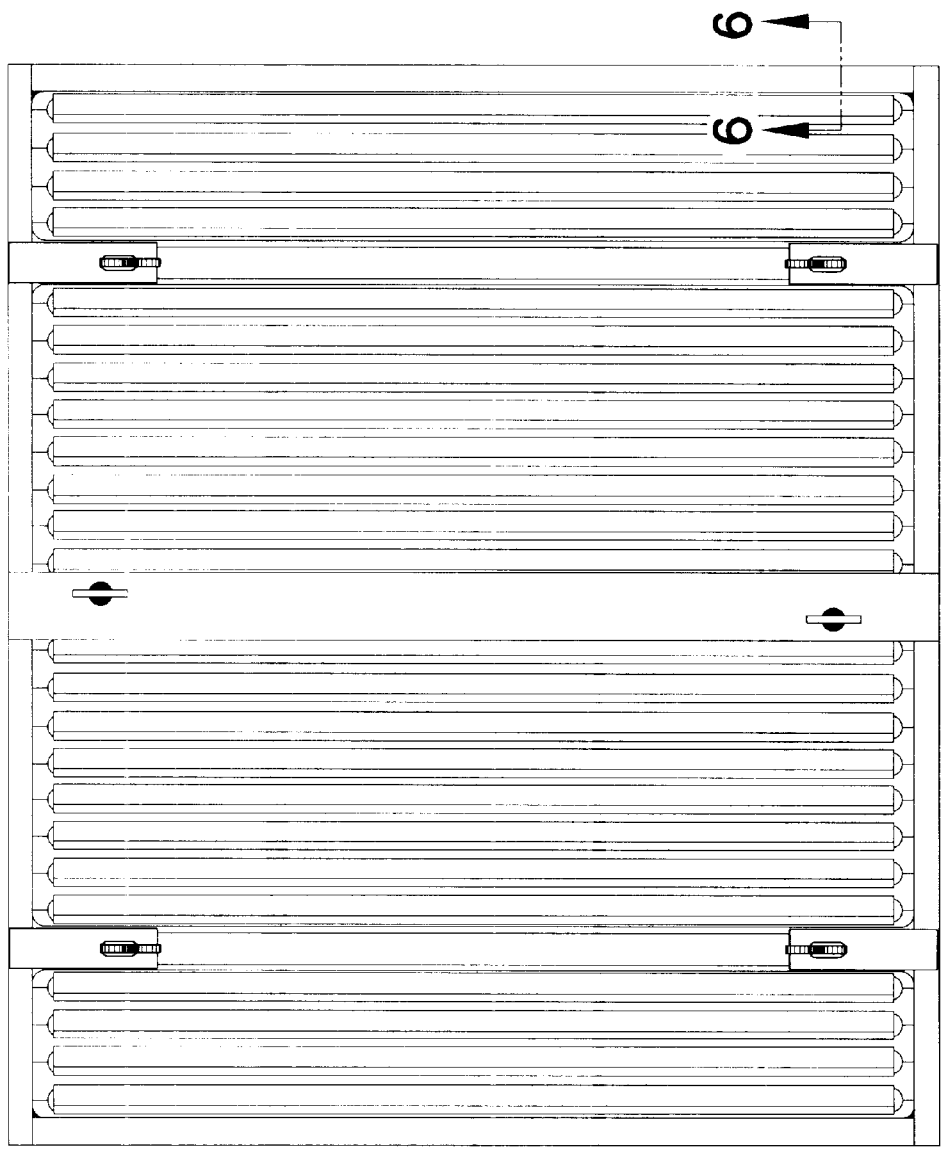
FIG. 5 is a top plan view of the filter frame assembly depicted in FIG. 3, according to the present invention.

Second rail 81 is secured to the first frame section 70 and extends partially transversely across the filter element assembly 50 along a top region. The second rail 81 includes opposite end portions 86, 87. End 86 extends to an outer periphery of the first frame section 70, while end 87 extends directly over and above first frame section 70. As illustrated in FIGS. 3 and 5, first mounting rail 80 is disposed at an opposite end to second rail 81 on first frame section 70. In this way, first rail 80 and second rail 81 mount first frame section 70 between opposite parallel transverse bars of cabinet air filter 20.

As shown in FIG. 4, end 87 is chamfered. The chamfer allows for pivoting or tilting of rail 81 relative to frame section 70, in order to position end portion 86 onto and over transverse bar 47 in cabinet 40.

Second mounting arrangement 66 includes a third mounting rail 91 and a fourth mounting rail 92. Third rail 91 extends partially transversely across a top region of the filter element assembly 50 and is selectively, removably secured to the second frame section 72. Third mounting rail 91 includes opposite ends 156, 157. End 156 extends to an outer periphery 79 of the second frame section 72, while end 157 extends over and above second frame section 72.

End 157 is chamfered or bevel cut. This allows for pivoting or tilting of rail 81 relative to frame section 72, in order to position end portion 157 onto and over transverse bar 47 in cabinet 40.

Fourth mounting rail 92 is selectively removably secured to second frame section 72 and extends partially transversely across the filter element assembly 50 along a top region. Fourth mounting rail 92 also includes opposite end portions 159, 160. End 159 extends to an outer periphery of the second frame section 72, while end 160 remains within the perimeter, although extending above, the second frame section 72. Third and fourth mounting rails 91, 92 are disposed at opposite ends of second frame section 72. As such, they engage or hook onto transverse bars 47 in cabinet air filter 20, to suspend or hold second frame section 72 within the cabinet.

End 160 is chamfered or bevel cut. As such, fourth mounting rail 92 is tiltable or pivotable relative to second frame section 72. This allows for orienting and position end portion 159 onto and over transverse bar 47 in cabinet 40.

In preferred embodiments, first mounting rail 65, second mounting rail 66, third mounting rail 91, and fourth mounting rail 92 are all identical. This provides for convenient fabrication and assembly. However, it is contemplated that in other embodiments, the mounting rails are custom designed, depending on the particular application.

Other embodiments for first and second mounting arrangements 65, 66 are contemplated. For example, the first mounting arrangement may include one transverse bar extending completely across the top region of the first frame section 70. Similarly, the second mounting arrangement 66 may include a single bar extending completely transversely across the top region of the second frame section 72. In this contemplated embodiment, each of the mounting rails has opposite ends, one of each which projects beyond the outer periphery of the respective frame section. Although this embodiment is contemplated and operable, the illustrated embodiment showing the first mounting arrangement as including a pair of mounting rails, and the second mounting arrangement as including a pair of mounting rails, is convenient and preferred.

A central rail 162 is mounted across the hinge arrangement 74, and bridges the first and second frame sections 70, 72. The central rail 162 includes opposite end portions 88, 89 which extend to the outer peripheries of the first and second frame sections 70, 72.

The mounting rails 65, 66, 91, 92, 162 may be secured to the frame 68 by a variety of arrangements. In the example illustrated, thumbscrews or bolts 90 are shown attaching the mounting rails to the frame 68. Each of the mounting rails 65, 66, 91, and 92 define an elongated slot 168. The slots 168 allow bolts 90 to pass through and engage or attach to a respective frame member. The elongated shape allows each of rails 65, 66, 91, 92 to slide relative to bolts 90 and a respective frame member.

The mounting rails permit the filter element assembly 50 to be secured to the cabinet 40. The gasket 78 is compressed against the transverse bars 47 within the cabinet 40 via the mounting rails, in the direction of airflow. This is discussed in more detail below.

FIG. 3 illustrates the filter element assembly as it would appear within the cabinet 40. That is, first and second frame sections 70, 72 are in alignment relative to each other, with the hinge arrangement 74 being in an unflexed state. The mounting rails 65, 66, 91, 92, 162 are secured to the frame 68.

In FIG. 4, the central mounting rail 162 is illustrated as being removed from the frame 68. The first frame section 70 is illustrated as being pivoted, or angled, relative to the second frame section 72 about hinge arrangement 74. The ability to "fold" the frame 68, by pivoting the first and second frame sections 70, 72 relative to each other, allows for the filter element assembly to be conveniently and quickly removed from the interior of the cabinet 40. The entire filter assembly may then be replaced with a new filter element assembly. A "new filter element assembly" may comprise another outer frame (tube sheet) with a new, unused set of bags. If using a new filter element assembly, the old one may be discarded, or the frame 68 may be reused with a new set of bags. Alternatively, only one or a few bags may be replaced in the existing frame 68. Alternatively, each of the dust bags 52 may be brushed clean, after which the assembly 50 may then be placed back into the cabinet 40.

Also shown in FIG. 4 is the mounting rails 65, 66, 91, 92 removed from the first and second frame sections 70, 72. During changeout of the filter element assembly 50, it is not necessary to remove the mounting rails 65, 66, 91, 92 from the first and second frame sections 70, 72. They are shown removed from the frame sections in FIG. 4 for clarity, to illustrate assembly.

To summarize, a filter component is described having an outer frame with first and second frame sections allowed to pivot with respect to each other with a hinge arrangement. Each of the first and second frame sections holds a plurality of cloth dust bags for filtering air. A mounting arrangement permits the frame to be secured within a cabinet air filter, whereby a gasket attached to the frame is compressed against mounting bars within the cabinet. The foldable nature of the frame allows for quick and convenient insertion and removal of individual filter elements.

Figure 9:
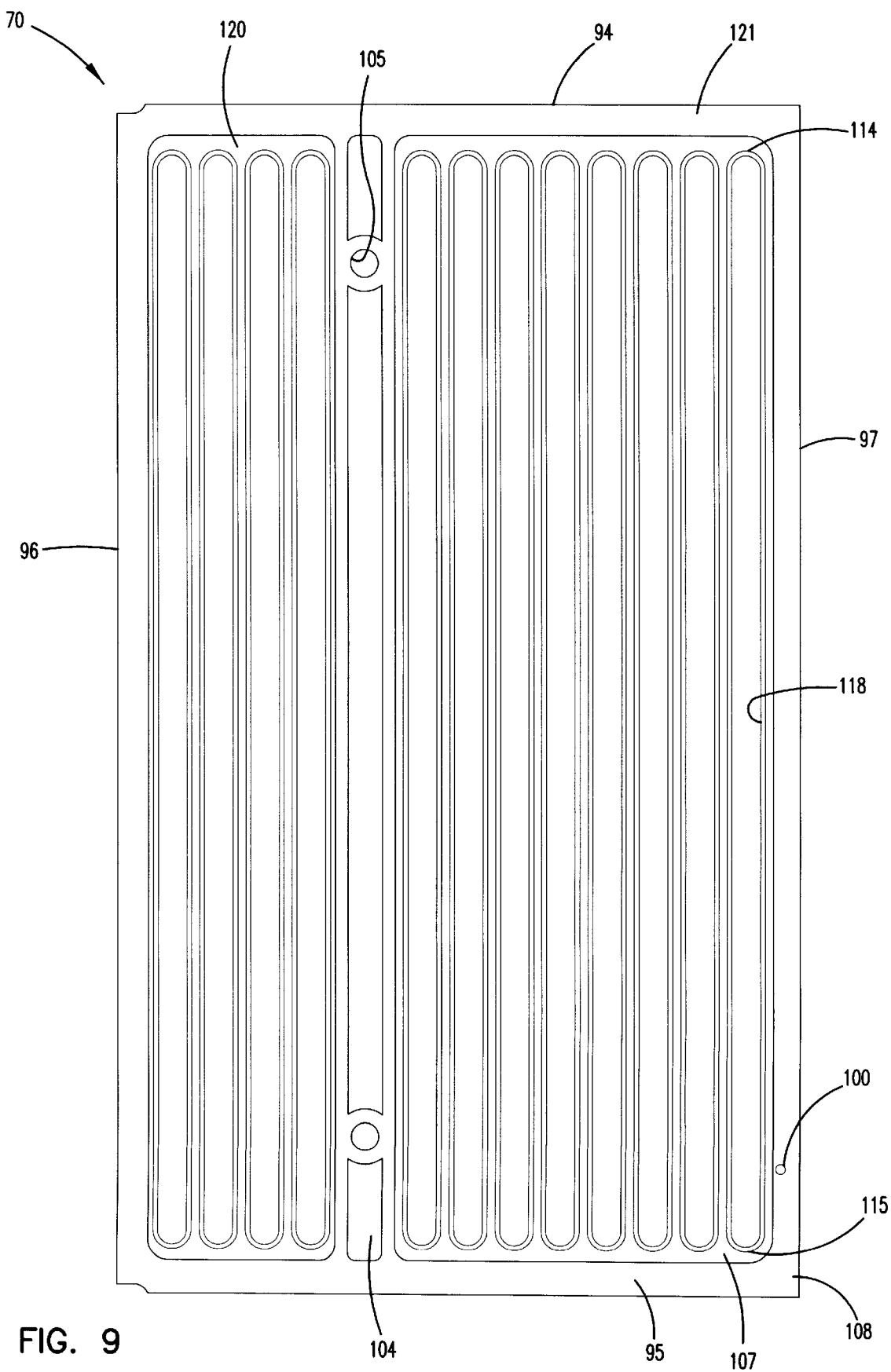
FIG. 9 is a top plan view of a frame section of a filter frame assembly, according to the present invention.

Turning now to FIG. 9, the first frame section 70 is shown in top plan view. The first frame section 70 includes two opposite side edges 94, 95 which extend generally normal to the edges of the filter element. The first frame section 70 also includes an end portion 96 extending between the side edges 94, 95. End portion 96 extends generally parallel to the direction of the filter elements, when the filter elements are installed in the first frame section 70. Opposite to the end portion 96 is a mating edge 97. The edge 97 is the edge which either abuts, or is in intimate contact with, or nearly engages, or is joined to a corresponding mating edge to the second frame section 72. In the example illustrated, first frame section 70 is constructed of a molded plastic material, preferably ABS plastic.

Figure 8:
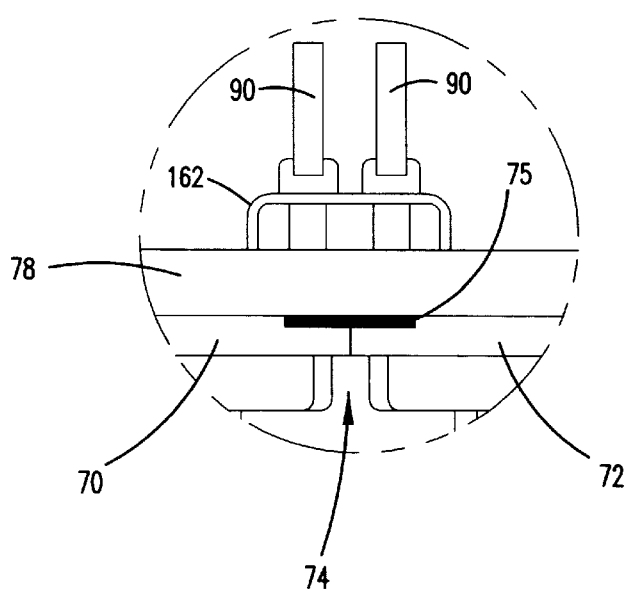
FIG. 8 is an enlarged, partially fragmented view of a hinge joint between two frame sections of the filter frame assembly depicted in FIG. 7, according to the present invention.
Figure 11:
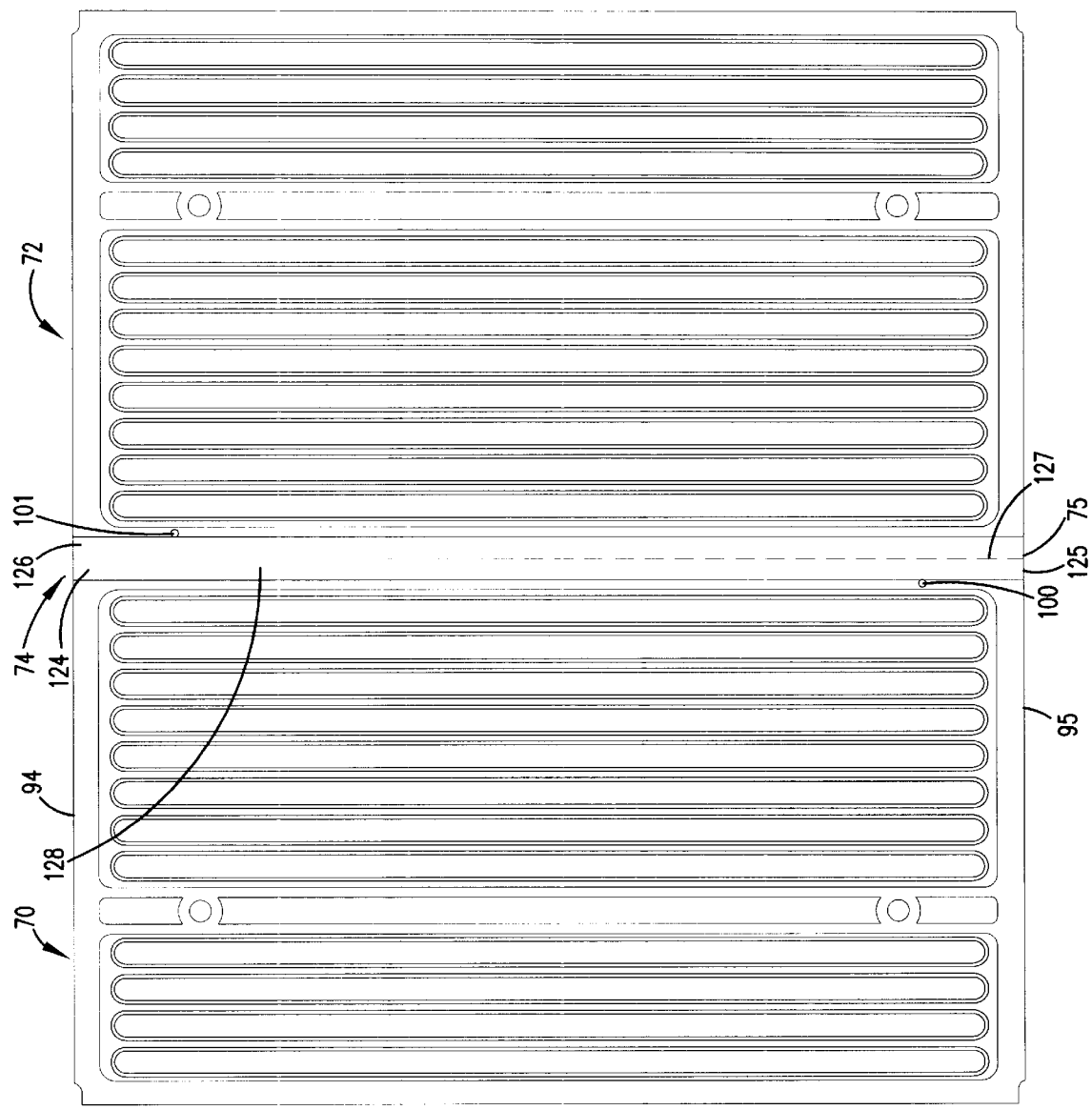
FIG. 11 is a top plan view of two frame sections joined by a hinge arrangement, according to the present invention.

Spaced from mating edge 97 and extending through the thickness of first frame section 70 is a threaded mounting bore 100. Mounting bore 100 includes a threaded receiving hole set into the first frame section 70. The mounting bore 100 preferably is a metal insert set into the bore. This is to prevent stripping of the threads in the bore 100. The bore 100 is spaced a sufficient distance from the edge of mating edge 97 in order to accommodate the hinge arrangement 74. For example, in the illustrated embodiment, the hinge arrangement 74 includes a living hinge 75. In the example illustrated, the living hinge 75 includes a strip of material joining the first and second frame sections 70, 72 (FIGS. 8 and 11). In order to access the mounting bore 100 with a fastener, the mounting bore 100 is spaced apart from the mating edge 97 a sufficient distance to accommodate the strip of material comprising the living hinge 75. Further details regarding the hinge arrangement 74 is described below in conjunction with FIG. 11.

The first frame section 70, in the illustrated embodiment includes a mounting section 104. Mounting section 104 extends generally parallel to end portion 96 and mating edge 97, and is normal to side edges 94, 95. Mounting section 104 is generally planar and defines a plurality of mounting bores 105. Mounting bores 105 preferably include metal threaded members set into the frame section 70. The metal insert helps to prevent stripping of the threads. In the illustrated embodiment, the mounting section 104 defines two mounting bores 105. The mounting bores 105 accommodate bolts 90 for securing the first and second mounting rails 65, 66 (FIGS. 3 and 4) thereto.

Figure 10:
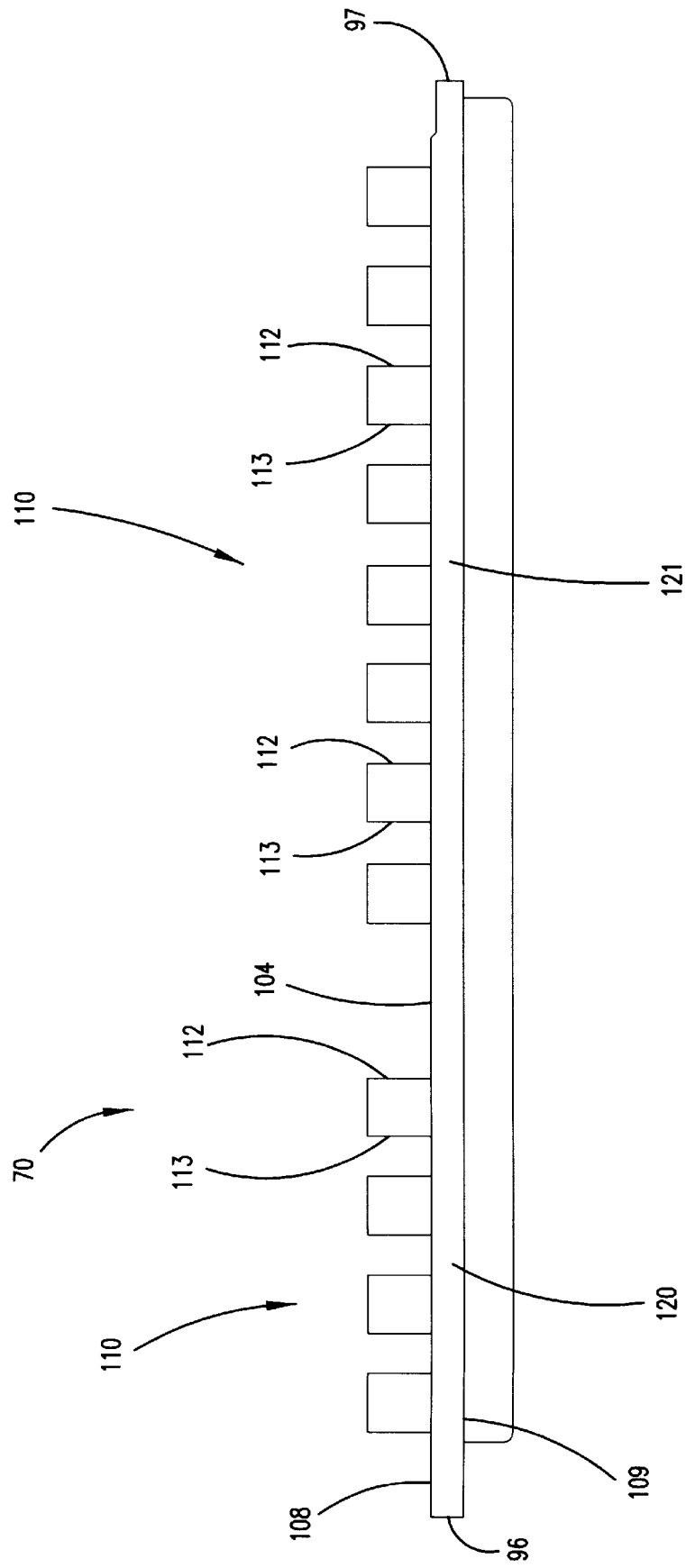
FIG. 10 is a side elevational view of the frame section of FIG. 9, according to the present invention.

The first frame section 70 includes a first side 108 and a second, opposite side 109 (FIG. 10). Projecting outwardly from the first side 108 is a plurality of mounting wall arrangements 110. Mounting wall arrangements 110 accommodate the filter elements 51, in the example illustrated, cloth bags 52. In particular, the mounting wall arrangements include a first wall 112, and a second wall 113 spaced from, parallel to, and aligned with the first wall 112. The first and second walls 112, 113 extend from and beyond a generally planar surface 107 of the first side 108. The first and second walls 112, 113 are joined at rounded end portions 114, 115 (FIG. 9). The first and second walls 112, 113 together define a through slot 118 for accommodating a filter bag 52. In the example illustrated, there are a total of 12 mounting wall arrangements 110 in the first frame section 70. Four of the mounting wall arrangements 110 are on a first side 120 of the mounting section 104, while the remaining eight mounting arrangements 110 are on a second side 121 of the mounting section 104. Of course, the number of mounting arrangements may include more or fewer than 12, but the number shown in convenient and preferred. In addition, there may be an equal number of mounting arrangements on the first and second sides 120, 121 of the mounting section 104; six and six, for example. However, the illustrated embodiment is preferred and convenient.

Turning now to FIG. 11, the first and second frame sections 70, 72 are shown in top plan view joined by hinge arrangement 74. The second frame section 72 is substantially identical to the first frame section 70. By "substantially identical", it is meant that the first and second frame sections 70, 72, when oriented co-planar to one another, together exhibit a two-fold axis of symmetry about a central orthogonal axis of rotation. That is, when the first frame section 70 is rotated twice about an axis generally collinear with mating edge 97, the first frame section 70 is identical to the second frame section 72. This allows for both of the first and second frame sections 70, 72 to be made from the same mold, during the manufacturing process. For example, the threaded mounting bore 100 in the first frame section 70 corresponds to a mounting bore 101 in the second frame section 72.

The hinge arrangement 74 joins the first and second frame sections 70, 72 together. This joint may be a removable type of joint, such as a hook and lip, or it may be in the form of a more permanent attachment. In the particular embodiment illustrated, a living hinge 75 is used. The living hinge 75 includes a strip of material 124 extending between the side edges 94, 95. The strip of material 124 includes a first hinge plate 125 secured to the first frame section 70, and a second hinge plate 126 secured to the second frame section 72, separated by a fold line 127. One suitable strip of material 124 includes a band 128 of high density polyethylene (HDPE) secured to the first and second frame sections 70, 72 by an adhesive.

FIG. 8 also shows a side elevational view of the hinge arrangement 74. While in the illustrated embodiment the living hinge 75 is shown extending across the top sides of the frame sections, in other embodiments the living hinge extends across the bottom side. Hinge 75 lies flush with first and second frame sections 70, 72. This arrangement permits gasket 78 to set level and flat relative to first and second frame sections 70, 72.

Figure 6:
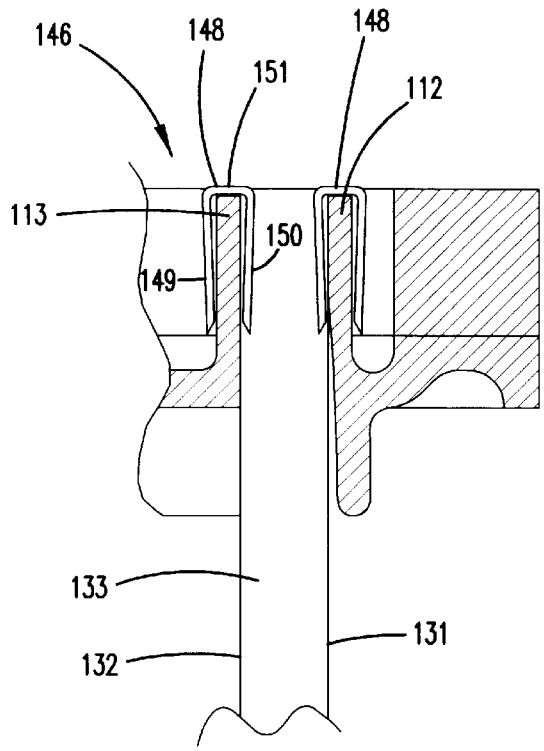
FIG. 6 is an enlarged, fragmented, cross-sectional view taken along the line 6—6 in FIG. 5.
Figure 7:
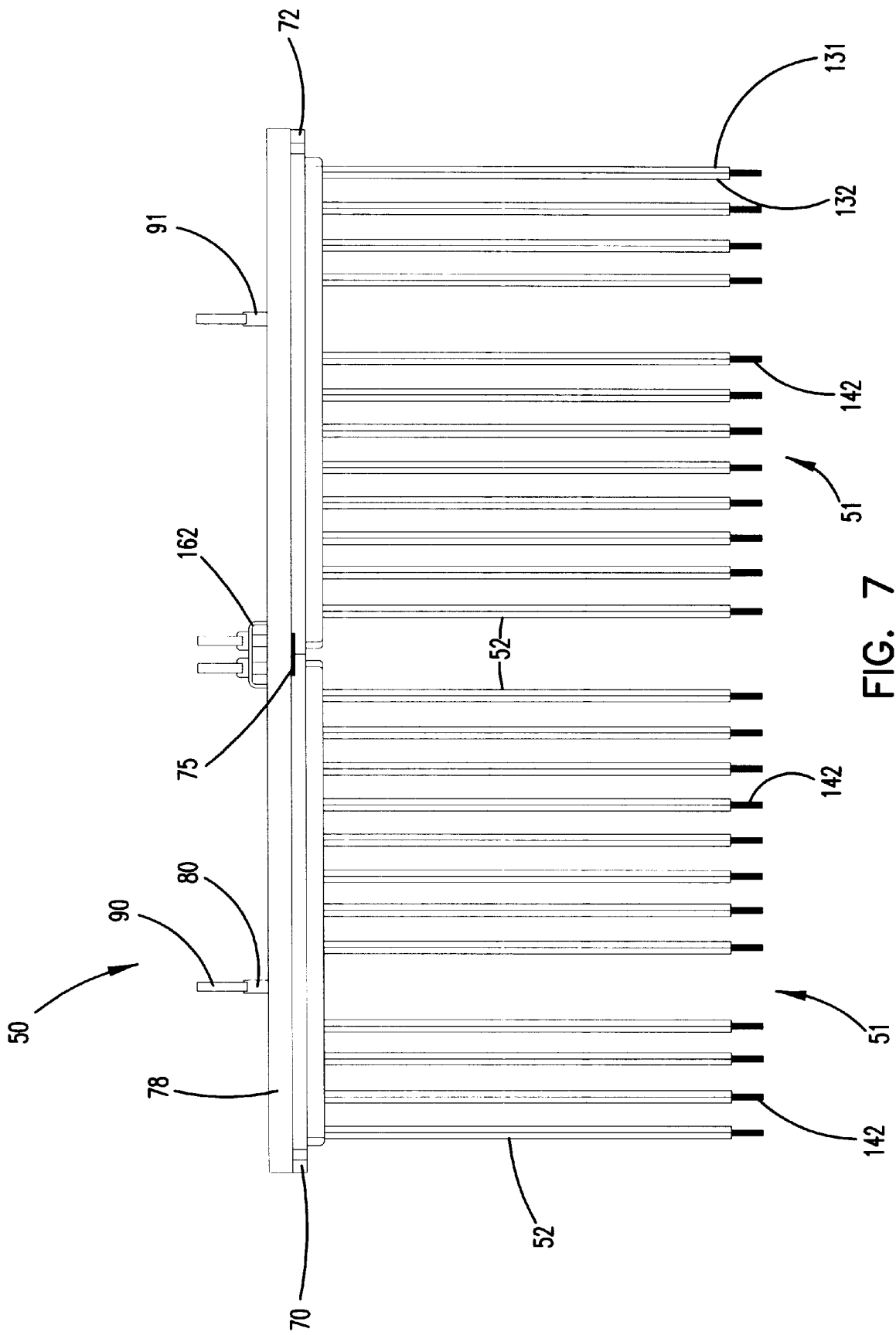
FIG. 7 is a side elevational view of a filter frame assembly depicted in FIG. 5, according to the present invention.

Turning now to FIGS. 5–7, FIG. 5 shows a top plan view of the first and second frame member 70, 72 with filter elements mounted therein. FIG. 7 shows a side plan view of the filter elements 51 mounted in and suspended from the first and second frame members 70, 72. In the particular embodiment illustrated, the filter elements 51 include cloth bags 52. Each of the cloth bags 52 includes a first side wall 131 and a second side wall 132 spaced therefrom. The first and second side walls 131, 132 are stitched together along opposite side edge portions 134, 135, and also are stitched together along a bottom edge 136 (FIG. 3).

Separating the first and second side walls 131, 132 is a spacer within region 133. The spacer may include arrangements that hold the side walls apart, but not impede air flow therethrough. One preferred spacer includes an air laid fibrous polymeric material. This material holds the first and second side walls 131, 132 apart from each other in order to allow air flow therethrough. The first side wall 130 includes fastening members 138, 139 (FIG. 3) to secure the spacer material to the cloth bag 51. In the example illustrated in FIG. 3, the fastening members 138, 139 include staples. Other fasteners are contemplated.

Each of the filter elements 51 includes a rigid clip member 142 compressing the bottom edge 136. The clip member 142 is constructed of a rigid material, such as metal, and provides a surface for a shaker bar in the cabinet 40 to engage. The shaker bar bumps the clip members 142, in order to shake each of the cloth bags 52. This helps to shake off and dislodge dust particles which may have accumulated on the exterior of the first and second side walls 131, 132.

Each of the filter elements 51 is supported by the frame 68. In particular, each of the cloth bags 52 is removably secured to one of the first and second frame sections 70, 72. A mounting arrangement for securing the bags 52 to the frame sections is shown generally at 146 (FIG. 6). The mounting arrangement 146 allows for a secure attachment, while also permitting the bags to be easily removed and replaced from the frame. In the particular embodiment illustrated, the mounting arrangement 146 includes a pressure clip 148. Pressure clip 148 includes two elongated sides 149, 150 joined at a bight section 151. Pressure clips 148 are constructed of a material which allows for some flexibility, but has a sufficient memory to firmly and securely hold the bags 52 to the frame 68. The mounting arrangement 146 secures the cloth bags 52 to the frame 68 as follows:

The first side wall 131 of the bag 52 is wrapped around the first wall 112 of the frame section. An adhesive, such as M.E.K., is applied over the radiused end of the bag 52. The adhesive penetrates the bag 52 and attacks the wall 112 of the frame section, mechanically locking the bag 52 to the wall 112 of the frame section. The pressure clip 148 is then mounted thereover to compress the side wall 131 to the first wall 112 of the frame 68. The second side wall 132 is wrapped around the second wall 113, adhesive is applied, and a pressure clip 148 is mounted thereover to compress the side wall 132 against the second wall 113. To remove the cloth bag, each of the pressure clips 148 are slid off. The bags 52 are torn from frame 68 and removed through the slots 118.

III. Installation and Assembly

Figure 12:
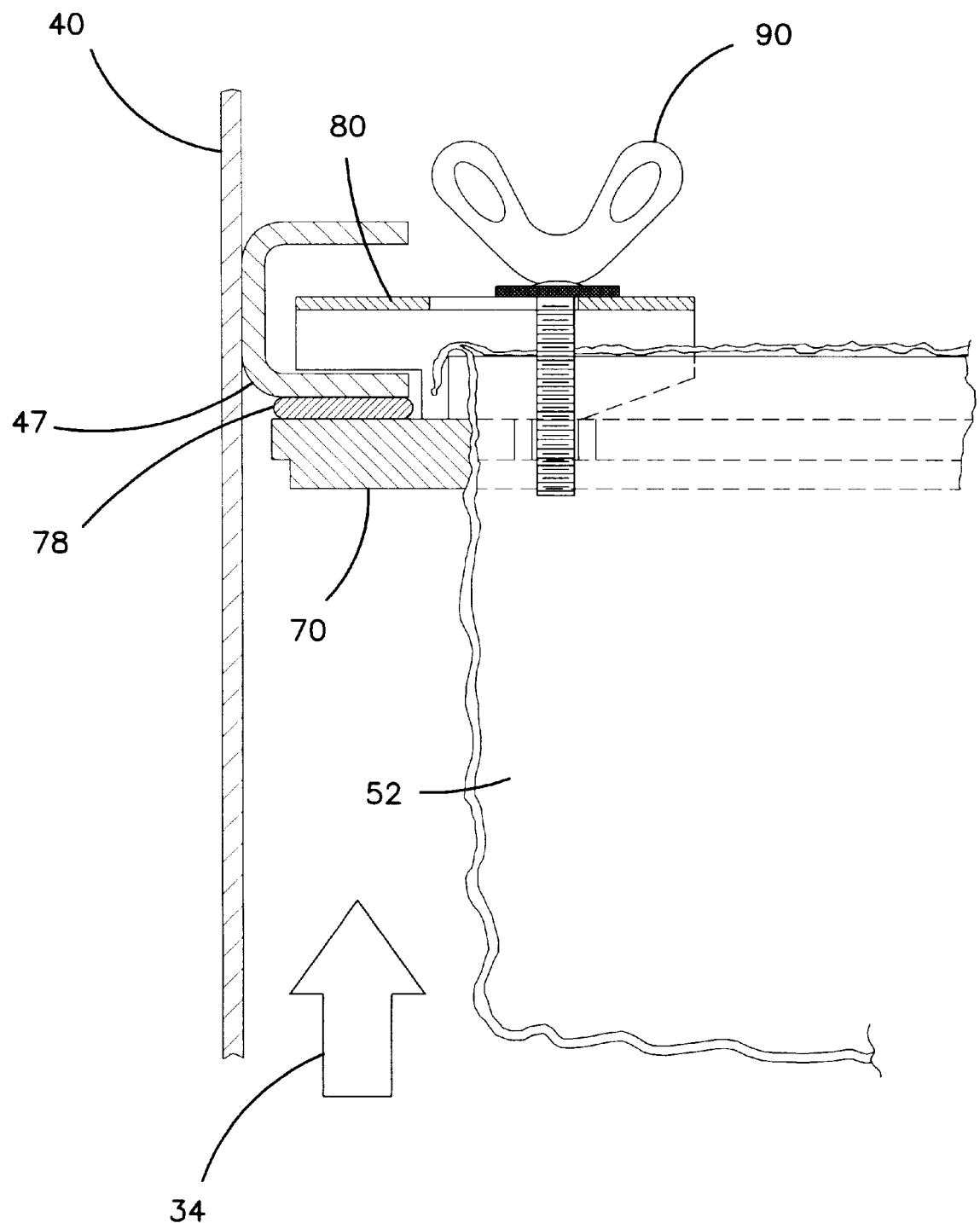
FIG. 12 is an enlarged, partially schematic, cross-sectional view depicting the filter frame assembly mounted in a cabinet.

The filter element assembly 50 is designed to be retrofit into existing cabinet dust collectors. For example, the constructions described herein may be conveniently used in Torit® Cabinet Dust Collectors Series 50, 60, 70, and 80, Models 54, 64, 66, 75, 81 and 84. Torit® cabinet dust collectors of the type mentioned above run at a rate of from 250 cfm to 1000 cfm. These types of dust collectors include transverse bars 47 as illustrated in FIG. 2 mounted on the side walls of the cabinet. These transverse bars are useful as providing a clamping surface for the gasket 78 on the filter element assembly 50 to compress up against. The rails 80, 81, 91, 92, 162 engage the top surface of the bars 47, and the bolts 90 draw the first and second frame sections 70, 72 toward the bars 47. This causes the gasket 78 to be compressed against the bars 47 in the direction of airflow, arrow 34 (FIG. 12).

To place the assembly 50 into cabinet 40, bolts 90 are loosened in the first and second mounting rails 80, 81 and third and fourth mounting rails 91, 92. In this manner, the mounting rails 80, 81, 91, 92 are spaced above gasket 78 to provide clearance to accommodate transverse bar 47. The mounting rails 80, 81, 91, 92 are pivoted to extend obliquely with respect to an axis 88 passing through hinge arrangement 74 (FIG. 4). Alternatively, the mounting rails 80, 81, 91, 92 are slid along elongated slots 168 relative to frame 68, such that respective outer ends 84, 86, 156, and 159 are within the border or periphery of frame 68.

The assembly 50 is moved into the cabinet interior, through an access port created by the bottom door. One of the first and second frame sections 70, 72, for example, the first frame section 70, is first held up against the bottom side of the transverse bars 47, to engage the top surface of the gasket 78 with the bottom side of the bars 47. The first mounting rail 80 is then arranged to the orientation illustrated in FIG. 3, that is, generally parallel to the axis 88 (FIG. 4), where the end 84 extends over the top of the bar 47 (FIG. 12). For example, first mounting rail 80 may be tipped or pivoted at chamfered end 85 to move end 84 in a position above or over bar 47. First mounting rail 80 is then slid relative to first frame section 70 along slot 168 to engage end portion 84 with bar 47.

The second mounting rail 81 is also oriented to a position where end 86 extends over the top of bar 53, analogously to that described for first mounting rail 80. The same procedure is repeated with respect to the other frame section, for example, the second frame section 72, and mounting rails 91, 92.

The bolts 90 are then tightened (that is, turned relative to mounting bores 105) to draw the frame 68 up to the bars 47, compressing the gasket 78 into the bars 47 and forming a seal. The central mounting rail 162 is also placed in position over the hinge arrangement 74, and the bolts 90 are tightened (i.e., turned relative to mounting bores 100) in this region as well.

The seal is created in the direction of airflow through the cabinet. That is, the seal is directed upwardly in the direction of arrow 34 (in the orientation shown in FIG. 2), toward the blower. This is an improvement over existing systems, where the seal was created against the direction of airflow.

To remove the assembly 50 from the cabinet 40, the bolts 90 are loosened, to push the gasket 78 out of compression with the bars 47. The central mounting rail 162 is removed, to expose the hinge arrangement 74. The first, second, third, and fourth mounting rails 80, 81, 91, 92 are either pivoted obliquely, or slid away from the perimeter of frame 68 along slots 168 so that their respective end portions are pulled out of engagement with the bars 47. The outer frame 68 is then folded. That is, the first frame section 70 is pivoted about the hinge arrangement 74 relative to the second frame section 72 (or, the second frame section 72 is pivoted about the hinge arrangement 74 relative to the first frame section 70). The folded assembly 50 is then removed from the cabinet through one of the access ports, created by the doors.

If an individual bag is to be replaced, after removing the assembly 50 from the cabinet 40, a first of the pressure clips 148 is removed from engagement with wall 112 of the mounting wall arrangements 110. Next, a second of the pressure clips 148 is removed from the oppositely disposed wall 113 of the mounting wall arrangements 110. The bag 52 is then pulled out through the slot 118. A new bag 52 is then inserted into the slot 118, folding the ends over first and second walls 112, 113, and pressure clips 148 are then snapped over the bag ends and the respective walls. If even more security and sealant is desired, adhesive is applied to bags 52 at their top radius or tip. The adhesive penetrates the bag material and attaches to the frame walls 112, 113, to mechanically attach bag 52 to frame 68. After this, the pressure clip 148 is snapped into place. When removing the bags 52, after pressure clip 148 is removed, the bag 52 is torn from frame 68, and then pulled out through slot 118. This may be repeated for each bag. However, it is convenient to change out all of the bags 52 at once by simply discarding the used filter element assembly 50 and inserting a new filter element assembly with a set of unused cloth bags.

IV. Some Preferred Materials

Preferably, the first and second frame sections 70, 72 are molded from an ABS plastic material.

The hinge arrangement 74 is preferably a living hinge 75. Living hinge 75 is constructed of high density polyethylene.

The mounting rails 80–82 are preferably constructed from sheet steel, 16 gauge.

Preferably, the bags 52 are constructed from a cloth material. In particular, preferably the material comprises a cotton sateen. This allows for a filtration of materials such as sawdust and flour dust.

Preferably, the gasket material comprises seal-foam closed cell PCV foam. Such material is available from Duraco, Inc., Chicago, Ill. 60622.

Preferably, pressure clips 148 are made from DuPont Zytel FE4200, available from Gemini Plastics, Inc., Ubly, Mich.

V. Sample Specifications

In this section, an example is provided of a set of operating materials and specifications. These are intended as an example. A wide variety of alternate sizes can be used.

Each of the filter frame sections 70, 72 have a length running between side edges 94 and 95 of about 18 inches (46 cm). The length of the side edges 94 and 95 extending between the end edge portion 96 and mating edge portion 97 is about 10–11 inches (25–28 cm). The height of the first and second walls 112, 113 is about 0.5 inch (13 mm). The distance between the inside edges of opposing walls 112 and 113 is about ⅜ inch (10 mm).

The width of the gasket 78 is about 0.5 inch (13 mm), and the thickness, in an uncompressed state, is about 0.5 inch (13 mm).

The diameter of each of the receiving bores 105 is about 0.4 inches (10 mm). The diameter of the receiving bores 100 is about 0.2 inches (5 mm).

The living hinge 75 has a width of about 0.9 inch (23 mm) and a length of about 18 inches (46 cm).

The central mounting rail 162 has a length of about 18.9 inches (48 cm), a width of about 2 inches (5 cm), and a height of about 0.4 inch (10 mm).

Dust bags 52, when suspended from the frame 78, extend a vertical distance of about 9.6 inches (24 cm).

The mounting clips 148 have an overall length of about 16.9 inches (43 cm), a height of about 0.5 inch (13 mm), and a width, in a resting state, of about 0.08 inch (2 mm) at the open end and about 0.18 inch (5 mm) at the closed end.

The above specification, examples and data provide a complete description of the manufacture and use of the invention. Many embodiments of the invention can be made without departing from the spirit and scope of the invention.

We claim:

1. A filter component comprising:
   (a) an outer frame having first and second independent rigid frame sections;
      (i) said first rigid frame section being pivotable, relative to said second rigid frame section about a pivot arrangement;
      (ii) said first and second rigid frame sections, when oriented co-planar to one another, together exhibiting a two-fold axis of symmetry about said pivot arrangement;
   (b) at least two filter bags;
      (i) at least one of said at least two filter bags being mounted on, and depending from, said first rigid frame section; and
      (ii) at least one of said at least two filter bags being mounted on, and depending from, said second rigid frame section.

2. A filter component according to claim 1 wherein:
   (a) said outer frame has first and second opposite sides;
   (b) said at least two filter bags are oriented to depend from said outer frame second side; and,
   (c) said filter component includes a perimeter gasket member oriented on said outer frame first side.

3. A filter component according to claim 1 wherein:
   (a) said pivot arrangement comprises a hinge arrangement.

4. A filter component according to claim 3 wherein:
   (a) said hinge arrangement comprises a living hinge having first and second, opposite, hinge plates securing said first and second rigid frame sections.

5. A filter component according to claim 4 wherein:
   (a) said first rigid frame section is secured to said first hinge plate by adhesive; and,
   (b) said second rigid frame section is secured to said second hinge plate by adhesive.

6. A filter construction according to claim 5 wherein:
   (a) said living hinge comprises a band of high density polyethylene material.

7. A filter construction according to claim 6 wherein:
   (a) said first rigid frame section and second rigid frame section each comprise plastic.

8. A filter component according to claim 1 wherein:
   (a) said first rigid frame section has a first side including a plurality of filter mounting wall arrangements projecting outwardly therefrom;
   (b) said second rigid frame section has a first side including a plurality of filter mounting wall arrangements projecting outwardly therefrom; and,
   (c) each of said filter mounting wall arrangements comprise first and second spaced, aligned, wall sections positioned on opposite sides of an associated filter bag mounting slot.

9. A filter component according to claim 8 wherein:
   (a) each mounting slot includes an associated filter bag projecting therethrough.

10. A filter component according to claim 9 wherein:
    (a) each filter bag includes first and second side walls;
       (i) each filter bag side wall being releasably secured to a selected, associated, wall section; and,
       (ii) no wall section having more than one filter bag mounted thereto.

11. A filter component according to claim 10 wherein:
    (a) said first rigid frame section includes at least 10 filter bags mounted thereon; and,
    (b) said second rigid frame section includes at least 10 filter bags mounted thereon.

12. A filter component according to claim 11 wherein:
    (a) each filter bag first side wall is secured to an associated wall section by an elongate pressure clip; and,
    (b) each filter bag second side wall is secured to an associated wall section by an elongate pressure clip.

13. A filter construction according to claim 12 including:
    (a) first, second, third, and fourth mounting rails;
       (i) said first and second mounting rails being secured to said first rigid frame section; each of said first and second mounting rails having an end portion projecting beyond an outer periphery of said first rigid frame section; and,
       (ii) said third and fourth mounting rails being secured to said second rigid frame section; each of said third and fourth mounting rails having an end portion projecting beyond an outer periphery of said second rigid frame section.

14. A filter component according to claim 13 wherein:
    (a) each of said first and second rigid frame members includes a plurality of threaded mounting bores therein;

(b) said first mounting rail being bolted to at least one of said bores in said first rigid frame member;

(c) said second mounting rail being bolted to at least one of said bores in said first rigid frame member;

(d) said third mounting rail being bolted to at least one of said bores in said second rigid frame member; and (e) said fourth mounting rail being bolted to at least one of said bores in said second rigid frame member.

15. A filter component according to claim 14 wherein:

(a) each filter bag comprises a cotton sateen.

16. A filter assembly comprising:

(a) a filter cabinet defining an interior;

(b) first and second transverse bars secured within said filter cabinet interior;

(c) a filter component suspended within said filter cabinet interior; said filter component comprising:
  (i) a first frame section;
     (A) said first frame section holding at least one filter bag;
  (ii) a second frame section;
     (B) said second frame section holding at least one filter bag;
  (iii) said first frame section being pivotable, relative to said second frame section about a pivot arrangement;
  (iv) a perimeter gasket member oriented on said first and second frame sections, said perimeter gasket having a top surface;
     (A) said filter component being mounted within said cabinet interior, such that said perimeter gasket top surface engages said first and second transverse bars;

(d) first and second mounting arrangements;
  (i) said first mounting arrangement being secured to said first frame section and engaging said first and second transverse bars;
  (ii) said first mounting arrangement including first and second mounting rails;
     (A) said first mounting rail engaging said first transverse bar;
     (B) said second mounting rail engaging said second transverse bar;
  (iii) said second mounting arrangement being secured to said second frame section and engaging said first and second transverse bars;
  (iv) said second mounting arrangement including third and fourth mounting rails;
     (A) said third mounting rail engaging said first transverse bar; and
     (B) said fourth mounting rail engaging said second transverse bar.

17. A filter assembly according to claim 16, wherein:

(a) said cabinet includes an air inlet, an air outlet, and a blower assembly to direct air through said filter component.

18. A filter assembly according to claim 16, wherein:

(a) said pivot arrangement includes a hinge.

19. A filter assembly according to claim 16, wherein:

(a) said filter bag in said first frame section includes a cloth bag; and (b) said filter bag in said second frame section includes a cloth bag.

20. A method of changing a filter bag of a cabinet air filter assembly; said method including steps of:

(a) opening an access port in the cabinet air filter assembly;

(b) removing a first mounting rail to expose a hinge arrangement on a first tube sheet having a plurality of filter bags hanging therefrom;

(c) removing the first tube sheet having the plurality of filter bags thereon from an interior of the cabinet air filter assembly by passage through the access port;
  (i) said step of removing including a step of at least partially folding the first tube sheet about the hinge arrangement.

21. A method according to claim 20 including a step of:

(a) replacing the first tube sheet having a plurality of depending filter bags with a second tube sheet having a plurality of depending filter bags thereon;
  (i) said step of replacing including a step of at least partially folding said second tube sheet while inserting the tube sheet through the access port and into the interior of the cabinet air filter assembly.

22. A method according to claim 20 including steps of:

(a) replacing at least one of the filter bags on said first tube sheet; and, (b) reinserting the first tube sheet with at least one replacement filter bag thereon into the interior of the cabinet air filter assembly;
  (i) said step of reinserting including a step of at least partially folding the first tube sheet during said reinserting.

23. A method according to claim 20 wherein the step of removing the tube sheet comprises removing the tube sheet from against a pair of transverse bars in the interior of the cabinet.

24. A method according to claim 23 wherein the step of removing a first mounting rail comprises:

(i) loosening at least one bolt; and (ii) pulling the first mounting rail out of engagement with the pair of transverse bars in the interior of the cabinet.

25. A method according to claim 24 wherein the step of loosening at least one bolt includes pushing a gasket out of compression with the pair of transverse bars.

26. A method according to claim 25 wherein:

(a) before the step of removing the first tube sheet, pivoting obliquely a plurality of second mounting rails relative to the pair of transverse bars.

* * * * *